(12) United States Patent
Pan

(10) Patent No.: US 10,801,199 B2
(45) Date of Patent: Oct. 13, 2020

(54) BACKGROUND WALL STRUCTURE

(71) Applicant: Guojun Pan, Shanghai (CN)

(72) Inventor: Guojun Pan, Shanghai (CN)

( * ) Notice: Subject to any disclaimer, the term of this patent is extended or adjusted under 35 U.S.C. 154(b) by 0 days.

(21) Appl. No.: 16/251,566

(22) Filed: Jan. 18, 2019

(65) Prior Publication Data

US 2020/0232211 A1 Jul. 23, 2020

(51) Int. Cl.
E04B 2/74 (2006.01)
F16M 11/00 (2006.01)
F16M 13/02 (2006.01)

(52) U.S. Cl.
CPC ............ *E04B 2/7407* (2013.01); *F16M 11/00* (2013.01); *F16M 13/022* (2013.01); *E04B 2002/7477* (2013.01); *E04B 2002/7483* (2013.01)

(58) Field of Classification Search
CPC .......... E04B 2/7407; E04B 2002/7483; E04B 2002/7477; F16M 11/00; F16M 13/022
USPC ................ 211/33, 37, 206; D6/681
See application file for complete search history.

(56) References Cited

U.S. PATENT DOCUMENTS

| | | | | |
|---|---|---|---|---|
| 1,435,785 A * | 11/1922 | Alexander | ................ | A47F 7/24 248/165 |
| D149,816 S * | 6/1948 | Ivelow | ........................ | D6/681.1 |
| 2,533,324 A * | 12/1950 | Mendle | .............. | A47G 25/0664 211/206 |
| 2,588,557 A * | 3/1952 | Morris | ................. | A47B 81/007 118/503 |
| D303,004 S * | 8/1989 | Eckman | ........................ | D23/317 |
| 4,934,015 A * | 6/1990 | Mink | ........................ | A47L 4/04 15/268 |
| 5,749,480 A * | 5/1998 | Wood | ..................... | A47B 57/04 211/150 |
| 6,254,457 B1 * | 7/2001 | Perrin | ..................... | B24B 37/04 257/E21.244 |
| 7,249,680 B2 * | 7/2007 | Wang | ..................... | A47B 57/04 211/150 |
| 8,042,785 B2 * | 10/2011 | Durello | ................... | A47F 5/105 211/123 |
| 8,959,813 B2 * | 2/2015 | Denby | ...................... | A47F 5/10 211/175 |
| 8,967,402 B2 * | 3/2015 | Pintur | ................... | A47F 5/0018 211/103 |

(Continued)

FOREIGN PATENT DOCUMENTS

| | | | |
|---|---|---|---|
| CN | 207194236 U | * | 4/2018 |
| CN | 207919951 U | * | 9/2018 |

*Primary Examiner* — Cassandra Davis
(74) *Attorney, Agent, or Firm* — ZANIP

(57) ABSTRACT

A background wall structure. The background wall structure includes an object placing plate and a fifth straight rod, where a four-way member is movably mounted at each of the two sides of the fifth straight rod; a first straight rod is movably mounted at the top of each four-way member; the object placing plate is fixedly mounted between the first straight rods; an object placing plate fixing block is fixedly mounted at one side of each first straight rod; a second straight rod is movably mounted at the top of each first straight rod. The bottom of the background wall structure adopts the four-way members, the first elbow pipe and the fifth straight rod which are connected to form a triangular base, so that the background wall structure is stable after assembling, and is convenient to disassemble.

4 Claims, 4 Drawing Sheets

(56) References Cited

U.S. PATENT DOCUMENTS

D809,835 S * 2/2018 Greenspon .................... D6/681
D827,965 S * 9/2018 Barre ............................ D32/58

* cited by examiner

(12) United States Patent

BACKGROUND WALL STRUCTURE

TECHNICAL FIELD

The present utility model relates to the technical field of background walls, and more particularly, to a background wall structure.

BACKGROUND

With continuous development of times and continuous improvement of people's living standards, background walls are more and more widely used in people's lives. In order to meet needs of people on the background walls, background wall structures are changing continuously. However, existing background wall structures are inconvenient to disassemble, and thus are difficult to use. In addition, the existing background wall structures occupy relatively larger spaces because of their larger sizes. As a result, the existing background wall structures are likely to cause congestion, are low in economic efficiency, and are relatively uncompetitive in the market. Therefore, there is an urgent need to provide a background wall structure to solve the existing problems to allow people to use a background wall more efficiently.

Shortcomings of the existing background wall structures are as follows.

1. The existing background wall structures are inconvenient to disassemble, and thus are difficult to use.

2. The existing background wall structures occupy relatively larger spaces because of their larger sizes. As a result, the existing background wall structures are likely to cause congestion, are low in economic efficiency, and are relatively uncompetitive in the market.

SUMMARY

I. Technical Problems to be Solved

With respect to the shortcomings in the prior art, the present utility model provides a background wall structure which solves problems that the existing background wall structure is inconvenient to disassemble and occupies a relatively larger space because of its large size.

II. Technical Solutions

In order to achieve the above purposes, the present utility model provides the following technical solutions. A background wall structure comprises an object placing plate and a fifth straight rod, wherein a four-way member is mounted at each of the two sides of the fifth straight rod; a first straight rod is mounted at the top of each four-way member; the object placing plate is fixedly mounted between the first straight rods; an object placing plate fixing block is fixedly mounted at one side of each first straight rod; a second straight rod is mounted at the top of each first straight rod; a second support rod is mounted between the second straight rods; a third straight rod and a fourth straight rod are fixedly mounted at the top of the second support rod; a first support rod is mounted between the third straight rod and the fourth straight rod; an advertising picture is mounted between the first support rod and the second support rod; a second U-shaped pipe is mounted at the top of the first support rod; and the two ends of the bottom of the second U-shaped pipe are connected with the third straight rod and the fourth straight rod, respectively.

Preferably, the first support rod is located at the bottom of the second support rod.

Preferably, a pre-buried magnet is arranged at each of the two sides of the bottom of the object placing plate; and the object placing plate and the object placing plate fixing blocks are connected through the pre-buried magnets.

Preferably, a first elbow pipe and a third U-shaped pipe are connected through the four-way members; and the first U-shaped pipe, the four-way member, the fifth straight rod and the third U-shaped pipe are connected to form a triangle.

Preferably, a semi-circular snap ring is fixedly welded at one side of each object placing plate fixing block, and is fixedly mounted with the corresponding first straight rod.

III. Beneficial Effects

The present utility model provides a background wall structure which has the following beneficial effects.

(1) The bottom of the background wall structure provided by the present utility model adopts the four-way members, the first U-shaped pipe and the fifth straight rod which are connected to form a triangular base, so that the stability of the background wall structure is improved. In addition, the four-way members and the circular pipes adopt reasonable clearance fit, so that the structure is stable after assembling. A balance weight can be additionally arranged inside the circular pipe, namely, the fifth straight rod, to improve the stability of the background wall. The object placing plate and the object placing plate fixing blocks are locked through the strong magnets, so that the background wall structure is stable after assembling, and is convenient to disassemble. In addition, the background wall structure is simple to operate, so that time and labor are saved.

(2) The background wall structure provided by the present utility model occupies less space when placed in a room due to its smaller size, so that congestion is avoided; and the transportation cost and the occupied space are reduced. The overall background wall structure is simple and elegant. Thus, the background wall structure is higher in economic efficiency, and is more competitive in the market compared with the existing background walls.

Figure 1:
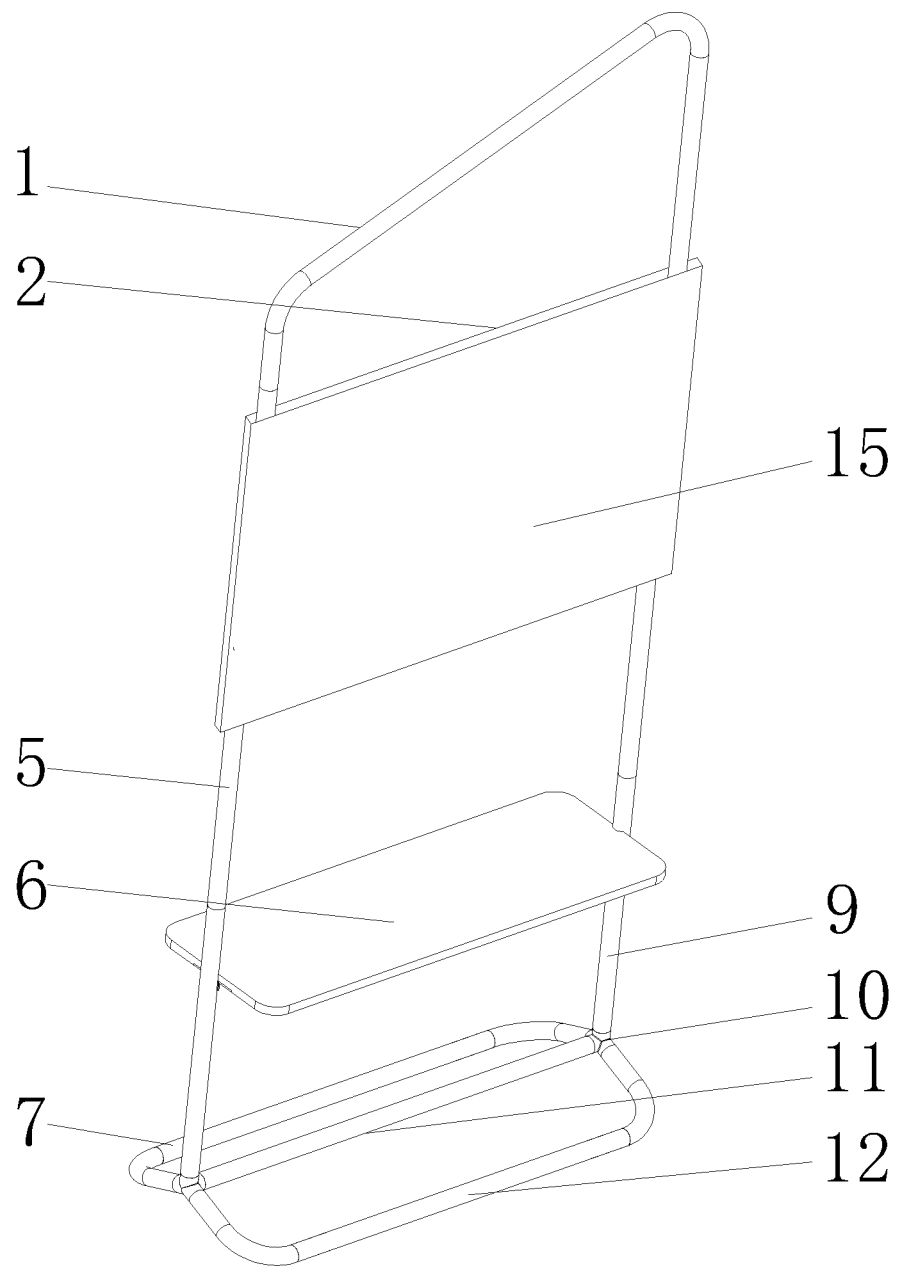
FIG. 1 is a front view of a background wall structure of the present utility model.

The reference numerals in the drawings are as follows: 1, second U-shaped pipe: 2, first support rod; 3, third straight rod; 4, second support rod; 5, second straight rod; 6, object placing plate: 7, first U-shaped pipe; 8, fourth straight rod; 9, first straight rod; 10, four-way member; 11 fifth straight rod; 12, third U-shaped pipe; 13, pre-buried magnet; 14, object placing plate fixing block; and 15, advertising picture.

DETAILED DESCRIPTION

The technical solutions of the embodiments of the present utility model will be described clearly and completely with reference to the drawings of the embodiments below. Apparently, the described embodiments are merely part of the embodiments of the present utility model, but not all of them. All other embodiments obtained by a person skilled in the art based on the embodiments of the present utility model without creative efforts shall belong to the protective scope of the present utility model.

Figure 2:
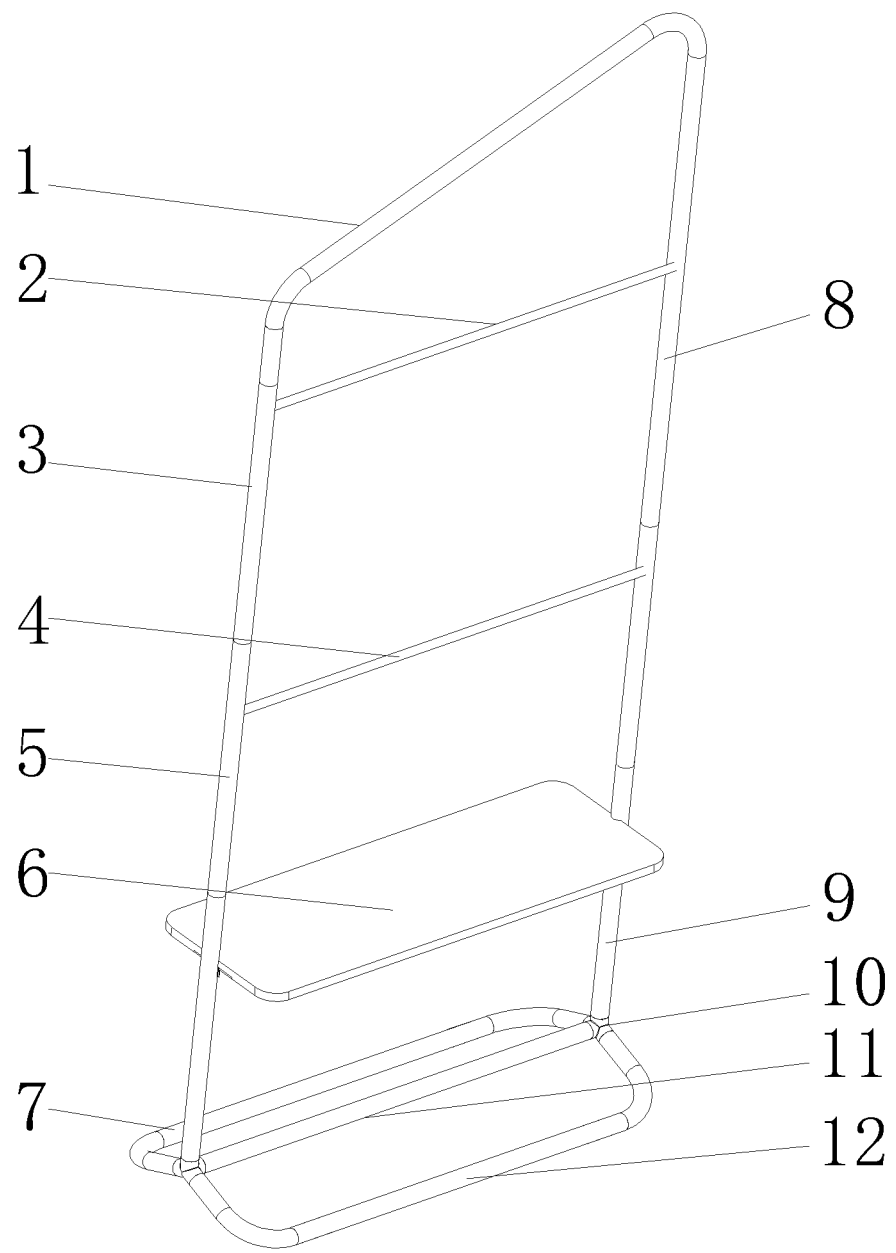
FIG. 2 is a schematically structural view of a background wall frame of the present utility model.
Figure 3:
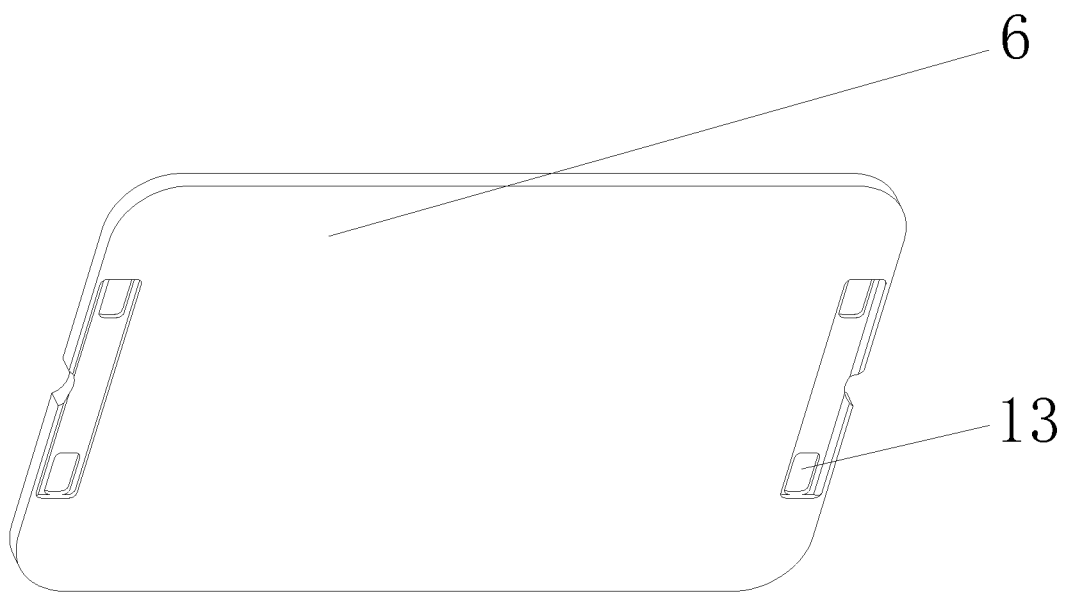
FIG. 3 is a schematically structural view of an object placing plate of the present utility model.
Figure 4:
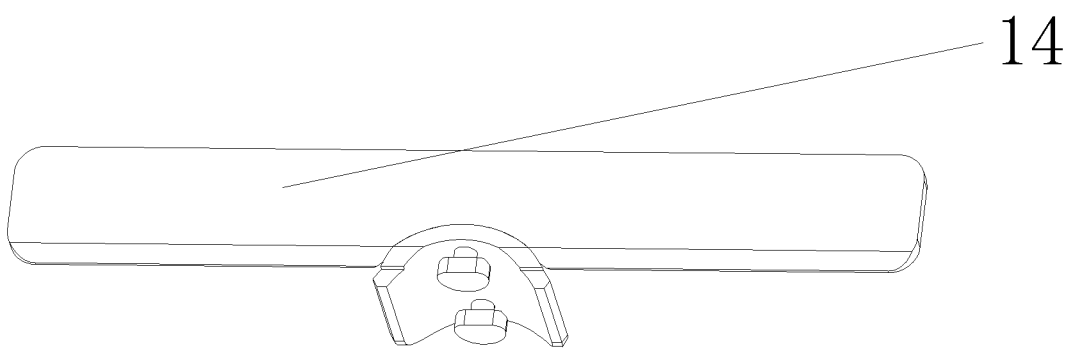
FIG. 4 is a schematically structural view of an object placing plate fixing block of the present utility model.
Figure 5:
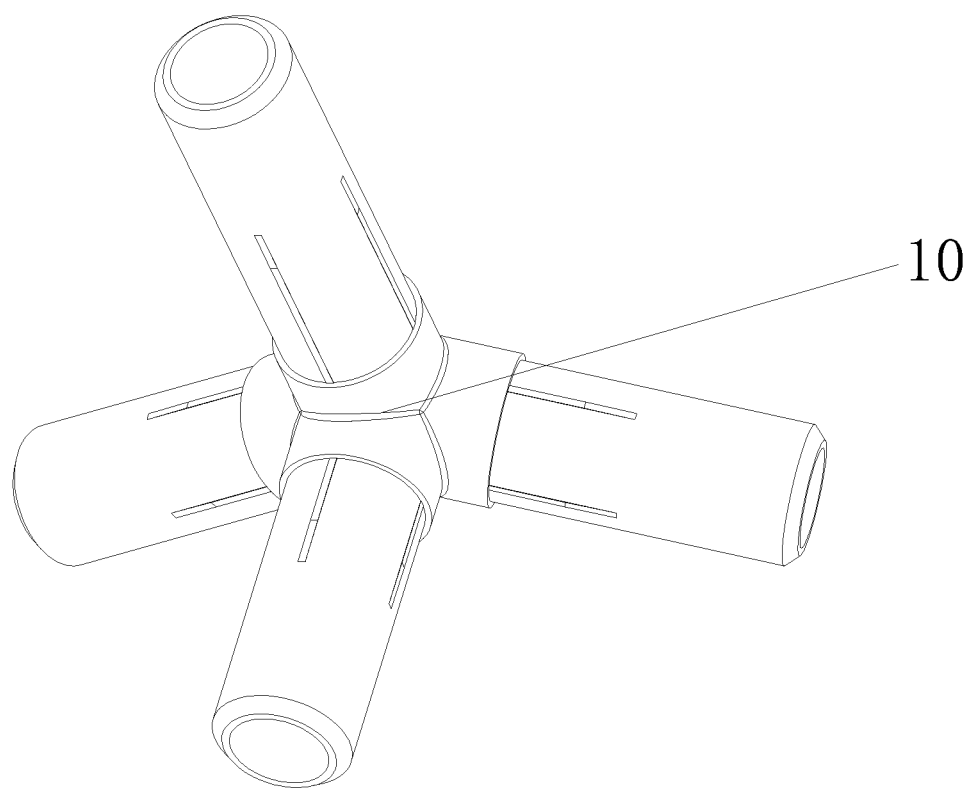
FIG. 5 is a schematically structural view of a four-way member of the present utility model.

As shown in FIGS. 1-5, according to one technical solution of the present utility model, a background wall structure comprises an object placing plate 6 and a fifth straight rod 11. A four-way member 10 is mounted at each of the two sides of the fifth straight rod 11. A first straight rod 9 is mounted at the top of each four-way member 10. The object placing plate 6 is fixedly mounted between the first straight rods 9. An object placing plate fixing block 14 is fixedly mounted at one side of each first straight rod 9. A semi-circular snap ring is fixedly welded at one side of each object placing plate fixing block 14, and is fixedly mounted with the corresponding first straight rod 9. A pre-buried magnet 13 is arranged at each of the two sides of the bottom of the object placing plate 6; the object placing plate 6 is connected with the object placing plate fixing blocks 14 through the pre-buried magnets 13, so that the object placing plate 6 and the object placing plate fixing blocks 14 are locked through the strong magnets, and the background wall structure is stable after assembling, and is convenient to disassemble. With the semi-circular snap ring at one side of each object placing plate fixing block 14, the object placing plate fixing block 14 can be effectively mounted onto the corresponding first straight rod 9, thereby facilitating the mounting of the object placing plate 6 later. A second straight rod 5 is mounted at the top of each first straight rod 9. A second support rod 4 is mounted between the second straight rods 5. A third straight rod 3 and a fourth straight rod 8 are fixedly mounted at the top of the second support rod 5. A first support rod 2 is mounted between the third straight rod 3 and the fourth straight rod 8, and is located at the bottom of the second support rod 4. An advertising picture 15 is mounted between the first support rod 2 and the second support rod 4, so that the present background wall structure can be effectively formed, and has the improved stability. A second U-shaped pipe 1 is mounted at the top of the first support rod 2; and the two ends of the bottom of the second U-shaped pipe 1 are connected with the third straight rod 3 and the fourth straight rod 8, respectively. A first U-shaped pipe 7 and a third U-shaped pipe 12 are connected through the four-way members 10; and the first U-shaped pipe 7, the four-way members 10, the fifth straight rod 11 and the third U-shaped pipe 12 are connected to form a triangle, so that the stability of the present background wall structure can be effectively improved as the triangle has stability. In addition, shrink pipe structures are adopted between the straight rods as well as between the straight rods and the U-shaped pipes to realize mutual connection. Moreover, the four-way members 10 and the circular pipes adopt reasonable clearance fit, so that the structure is stable after assembling. A balance weight can be additionally arranged inside the circular pipe, namely, the fifth straight rod 11 of the background wall, to improve the stability of the background wall. Further, the background wall structure is simple to operate, so that time and labor are saved; and the stability of the present background wall structure is further improved as the balance weight can be additionally arranged inside the circular pipe, namely, the fifth straight rod 11, of the background wall.

The working principle of the background wall structure is as follows. When in use, first, whether all components of the background wall structure can be used normally is checked. Second, a user can first mount the fifth straight rod 11 through a connecting hole of the four-way member 10, and then, the other four-way member 10 is mounted at the other end of the fifth straight rod 11. Third, the first U-shaped pipe 7 and the third U-shaped pipe 12 are mounted in two connecting holes at two sides of the four-way members 10 by the user to enable the first U-shaped pipe 7, the four-way members 10, the fifth straight rod 11 and the third U-shaped pipe 12 to form a triangle, so as to improve the stability of the background wall structure. Fourth, the first straight rod 9 is mounted in a connecting hole at the top of each four-way member 10; the object placing plate 6 is mounted between the first straight rods 9; and the two sides of the bottom of the object placing plate 6 and the object placing plate fixing blocks 14 are mounted together through the pre-buried magnets 13. The object placing plate 6 is fixed to the first straight rods 9 through the object placing plate fixing blocks 14, and is configured to allow users to place an object conveniently. Fifth, the second straight rod 5 is mounted at the top of each first straight rod 9 by the user. Sixth, the second support rod 4 is mounted between the second straight rods 5. Seventh, the third straight rod 3 and the fourth straight rod 8 are mounted at the tops of the second straight rods 5, respectively. Eighth, the first support rod 2 is mounted between the third straight rod 3 and the fourth straight rod 8. Ninth, the second U-shaped pipe 1 is mounted at the top of the third straight rod 3 and the fourth straight rod 8. In addition, during mounting, the user adopts the shrink pipe structures between the straight rods as well as between the straight rods and the U-shaped pipes to realize mutual connection; and the four-way members 10 and the circular pipes adopt reasonable clearance fit. After use, the user can disassemble the background wall structure for easy placement, so that the practicability of the background wall structure is improved. Thus, the background wall structure is convenient to disassemble, and the economic efficiency and the market competitiveness are improved.

In summary, the bottom of the background wall structure provided by the present utility model adopts the four-way members 10, the first U-shaped pipe 7 and the fifth straight rod 11 which are connected to form a triangular base, so that the background wall structure is stable after assembling, and is convenient to disassemble. Thus, the present background wall structure is convenient to operate, saves time and labor, occupies less space due to its smaller size, and has improved economic efficiency and market competitiveness.

It should be noted that, in the present utility model, while the terms "first", "second" and so on may be used to distinguish one entity or operation from another, it does not require or imply such actual relation or sequence between these entities or operations. Further, the terms "comprise", "include" or any variation thereof are intended to cover a nonexclusive containing, such that a process, a method, an item or a device comprising a series of elements not only includes these elements, but also comprises other elements that are not set forth specifically, or also comprises an inherent element of such a process, method, item or device.

Although the embodiments of the present utility model have been shown and described, it will be understood by those skilled in the art that various changes, modifications, alternatives and variations may be made to these embodiments without departing from the principle and spirit of the present utility model. The scope of the present utility model is defined by the appended claims and equivalents thereof.

What is claimed is:

1. A background wall structure, comprising: an object placing plate and a fifth straight rod, wherein a four-way member is mounted to each end of the fifth straight rod; a first straight rod is mounted at a top of each four-way member; the object placing plate is fixedly mounted between the first straight rods; an object placing plate fixing block is fixedly mounted at one side of each first straight rod; a second straight rod is mounted at a top of each first straight rod; a second support rod is mounted between the second straight rods; a third straight rod is fixedly mounted at a top of one of second straight rod and a fourth straight rod is fixedly mounted at a top of the other second straight rod; a first support rod is mounted between the third straight rod and the fourth straight rod; an advertising picture is mounted between the first support rod and the second support rod; a first U-shaped pipe is mounted at a top of the first support rod; the first U-shaped pipe is connected with the third straight rod and the fourth straight rod, respectively.

2. The background wall structure of claim 1, wherein a pre-buried magnet is arranged at each of two sides of a bottom of the object placing plate; and the object placing plate and the object placing plate fixing blocks are connected through the pre-buried magnets.

3. The background wall structure of claim 1, wherein a second U-shaped pipe and a third U-shaped pipe are connected through the four-way members (10); the second U-shaped pipe, the four-way members and the fifth straight rod are in a first plane; the third U-shaped pipe, the four-way members and the fifth straight rod are in a second plane; the two planes form an angle.

4. The background wall structure of claim 1, wherein a semi-circular snap ring is fixedly welded at one side of each object placing plate fixing block, and is fixedly mounted with the corresponding first straight rod.

* * * * *